(12) United States Patent
Hopkins et al.

(10) Patent No.: US 11,865,825 B2
(45) Date of Patent: Jan. 9, 2024

(54) SYSTEM, METHOD, AND APPARATUS FOR USE IN PLY COMPACTION IN FORMING A COMPOSITE STRUCTURE

(71) Applicant: The Boeing Company, Chicago, IL (US)

(72) Inventors: Andrew Hopkins, West Jordan, UT (US); Christopher Gary Harris, Copperton, UT (US); Scott Fisher, West Jordan, UT (US); Jessica Conaty, Salt Lake City, UT (US); Anton Troshchenovskyy, West Jordan, UT (US)

(73) Assignee: The Boeing Company, Arlington, VA (US)

( * ) Notice: Subject to any disclaimer, the term of this patent is extended or adjusted under 35 U.S.C. 154(b) by 110 days.

(21) Appl. No.: 16/601,073

(22) Filed: Oct. 14, 2019

(65) Prior Publication Data

US 2021/0107241 A1    Apr. 15, 2021

(51) Int. Cl.
*B32B 37/10* (2006.01)
*B29C 70/54* (2006.01)
*B29C 70/34* (2006.01)
*B29C 43/36* (2006.01)
*B29C 31/08* (2006.01)
*B29C 65/00* (2006.01)

(52) U.S. Cl.
CPC ............ *B32B 37/10* (2013.01); *B29C 31/085* (2013.01); *B29C 43/3642* (2013.01); *B29C 66/81455* (2013.01); *B29C 70/342* (2013.01); *B29C 70/543* (2013.01); *B29C 2043/3649* (2013.01)

(58) Field of Classification Search
None
See application file for complete search history.

(56) References Cited

U.S. PATENT DOCUMENTS

| | | | |
|---|---|---|---|
| 4,557,783 A | 12/1985 | Grone et al. | |
| 4,997,510 A | 3/1991 | Shinno et al. | |
| 5,006,990 A | 4/1991 | Ward et al. | |
| 5,139,604 A * | 8/1992 | Mitchell | B29C 63/04 100/211 |
| 5,954,917 A * | 9/1999 | Jackson | B29C 70/342 156/441 |
| 6,843,565 B2 | 1/2005 | Evans et al. | |
| 9,387,657 B2 | 7/2016 | Smith, Jr. et al. | |
| 2004/0041304 A1 * | 3/2004 | Willden | B29C 70/342 264/324 |

(Continued)

*Primary Examiner* — Christopher T Schatz
(74) *Attorney, Agent, or Firm* — Armstrong Teasdale LLP

(57) ABSTRACT

A method for use in ply compaction in forming a composite structure. The method includes positioning a ply of material on a forming tool having a web surface and at least one flange surface extending from the web surface, positioning a flange forming device at the ply of material on the forming tool, the flange forming device including an inflatable contact element pressurized to define a deformable contact surface, applying, by the deformable contact surface, the ply of material onto the forming tool with a predetermined pressure, wherein the deformable contact surface is moved across the forming tool, and wherein the inflatable contact element is configured to maintain the predetermined pressure as the deformable contact surface transitions from the web surface to the at least one flange surface.

20 Claims, 11 Drawing Sheets

(56) References Cited

U.S. PATENT DOCUMENTS

| | | |
|---|---|---|
| 2005/0236093 A1 | 10/2005 | Taggart |
| 2007/0175572 A1 | 8/2007 | Rubin et al. |
| 2007/0289699 A1 | 12/2007 | Benson et al. |
| 2008/0178996 A1* | 7/2008 | Tada ................... B29C 63/025 156/349 |
| 2009/0071592 A1 | 3/2009 | Benson et al. |
| 2009/0071597 A1* | 3/2009 | Benson ............... B29C 70/388 156/196 |
| 2011/0277918 A1* | 11/2011 | Lee ..................... B29C 33/505 156/156 |

\* cited by examiner

SYSTEM, METHOD, AND APPARATUS FOR USE IN PLY COMPACTION IN FORMING A COMPOSITE STRUCTURE

FIELD

The field relates generally to the manufacture of composite structures and, more specifically, to systems, methods, and apparatuses that enable ply-by-ply formation of composite structures.

BACKGROUND

Formed composite structures are commonly used in applications, such as aircraft and vehicles, where light weight and high strength are desired. These applications typically utilize complex contoured parts or channels which must be formed and then cured. Historically, the formation of complex contoured composite structures has included extensive hand labor prior to curing. Typically, pre-impregnated composite fiber plies ("pre-pregs") such as epoxy impregnated carbon fiber laminates are laid by hand over a shaped form or mandrel. Then the part is cured, often by heat curing. This results in a contoured part that matches the shape of the mandrel. However, manual lay-up of pre-preg plies or dry fabric is a time-consuming and laborious task. For example, in the manufacture of relatively large composite structures, a technician may be required to retrieve individual plies from a ply cutting station and then physically walk the plies along the mandrel to manually locate the plies thereon.

Some known composite manufacturing processes use a process known as drape forming, which uses vacuum bagging to form the composite structures. Drape forming has been used successfully to form composite structures where the structures being formed have a limited amount of pre-preg plies. This method includes heating a flat laminate pre-preg composite blank or charge and forcing it around a mandrel with the use of a vacuum bag. However, this method has has limited success on very thick laminates or those with more complex shapes. In addition, uncontrolled compression of the composite blanks when forced around the mandrel can result in buckling or wrinkling of the plies within a composite structure.

In some known methods, a compactor may be used to compress the composite blanks against a tool surface during the fabrication of contoured composite structures. In some cases, the tool surface may be contoured along one or more planes. Consequently, where the structure is contoured in more than one plane, the tool surface has relatively complex geometries that require the compaction process to be supplemented manually by hand. As noted above, manual lay-up of pre-preg plies or dry fabric is a time-consuming and laborious task. Also, the human factor involved in manual layup may introduce process variations that lead to undesired inconsistencies in the finished structures.

BRIEF DESCRIPTION

In one aspect, a method for use in ply compaction in forming a composite structure is provided. The method includes positioning a ply of material on a forming tool having a web surface and at least one flange surface extending from the web surface, positioning a flange forming device at the ply of material on the forming tool, the flange forming device including an inflatable contact element pressurized to define a deformable contact surface, applying, by the deformable contact surface, the ply of material onto the forming tool with a predetermined pressure, wherein the deformable contact surface is moved across the forming tool, and wherein the inflatable contact element is configured to maintain the predetermined pressure as the deformable contact surface transitions from the web surface to the at least one flange surface.

In another aspect, an apparatus for use in ply compaction in forming a composite structure is provided. The apparatus includes a forming tool having a web surface and at least one flange surface extending from the web surface, wherein the forming tool includes a length dimension. A chassis extends over the forming tool, wherein the chassis is movable relative to the forming tool along the length dimension. At least one flange forming device is coupled to the chassis, wherein the flange forming device includes an inflatable contact element pressurized to define a deformable contact surface configured to apply pressure to the web surface and to the at least one flange surface.

In yet another aspect, an apparatus for use in ply compaction in forming a composite structure is provided. The apparatus includes a base, and a forming head coupled to the base. The forming head includes a plurality of holding members, and an inflatable contact element extending across the plurality of holding members, wherein the inflatable contact element is pressurized to define a deformable contact surface configured to apply pressure to a work surface.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

Figure 1:
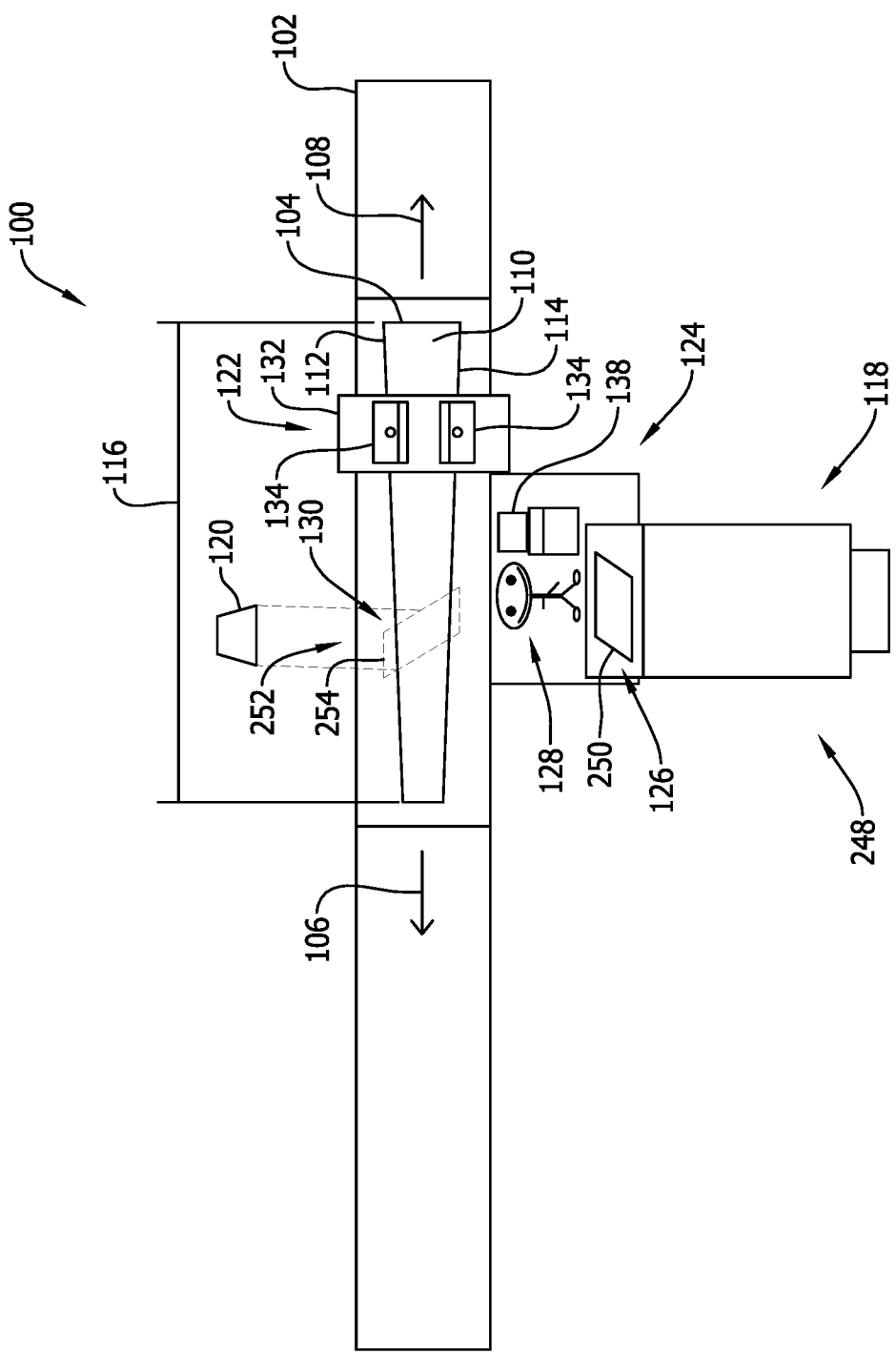
FIG. 1 is a schematic illustration of an example ply laydown system shown performing a first step of a laydown process.

The implementations described relate to systems, methods, and apparatuses that enable ply-by-ply formation of composite structures. For example, the systems described herein include an automated flange forming device that performs ply-by-ply formation and compaction of individual composite plies on a forming tool. The ply-by-ply formation is defined by the laydown of composite plies on the forming tool in a predetermined sequence, and the plies are compacted onto the forming tool individually after each ply is laid down, or after more than one ply has been laid down. The flange forming device described herein is mounted on a chassis that is movable relative to the forming tool to enable the forming tool to be located at each ply laydown location, and a forming head that is movable in a predefined range of motion to apply pressure to the plies on the forming tool. The predefined range of motion may be dimensionally limited by the physical constraints of the components that make up the flange forming device. In addition, in some implementations, the forming tool has a complex geometry and is contoured along one or more planes. As such, the flange forming device also includes parts and components (e.g., a bearing plate, a pitch actuator, and a orientation sensor) that enable the orientation of the flange forming device to be adjusted relative to the forming tool. Thus, the flange forming device is provided with the dynamic ability to adjust to variations in the tapering of the forming tool, and to facilitate maintaining parallelism with contoured surfaces of the forming tool, for example.

In the example implementation, the forming tool includes a web surface and at least one flange surface extending perpendicularly from the web surface. In the ply-by-ply formation process, a first portion of each ply is positioned on the web surface, and a second portion is draped over the edge of the web surface for extension across the at least one flange surface. In operation, the forming head moves across the web surface and then the flange surface to compact the plies on the forming tool. The forming head described herein includes an inflatable contact element that is pressurized to define a deformable contact surface configured to apply pressure to the surfaces of the forming tool. The contact element is pressurized to a degree that provides improved pressure uniformity and conformability to the contours of the forming tool as the forming head is moved in the predefined range of motion, and is swept from the web surface to the at least one flange surface. As such, a composite structure formed therewith is provided with reduced ply wrinkling, thereby reducing disruptions in manufacturing flow and the production of defective parts.

The system described herein also includes a ply distribution apparatus that is movable relative to the forming tool. The ply distribution apparatus fabricates the individual plies of composite material, and is capable of providing each ply at different locations along the forming tool. As such, a technician is not required to retrieve individual plies from a work station, and then manually walk each ply to a laydown location on the forming tool in accordance with the ply laydown sequence. The ply distribution apparatus also fabricates and provides the individual plies as-needed and on-demand in accordance with the ply laydown sequence. Thus, the need for ply sequencing, sorting, and storage of pre-fabricated plies is eliminated, thereby reducing manual labor and the opportunity for error in performing the ply laydown process.

The systems, methods, and apparatuses described herein enable ply-by-ply formation of composite structures in an error-reducing, ergonomically efficient, and at least semi-automated manner.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 2:
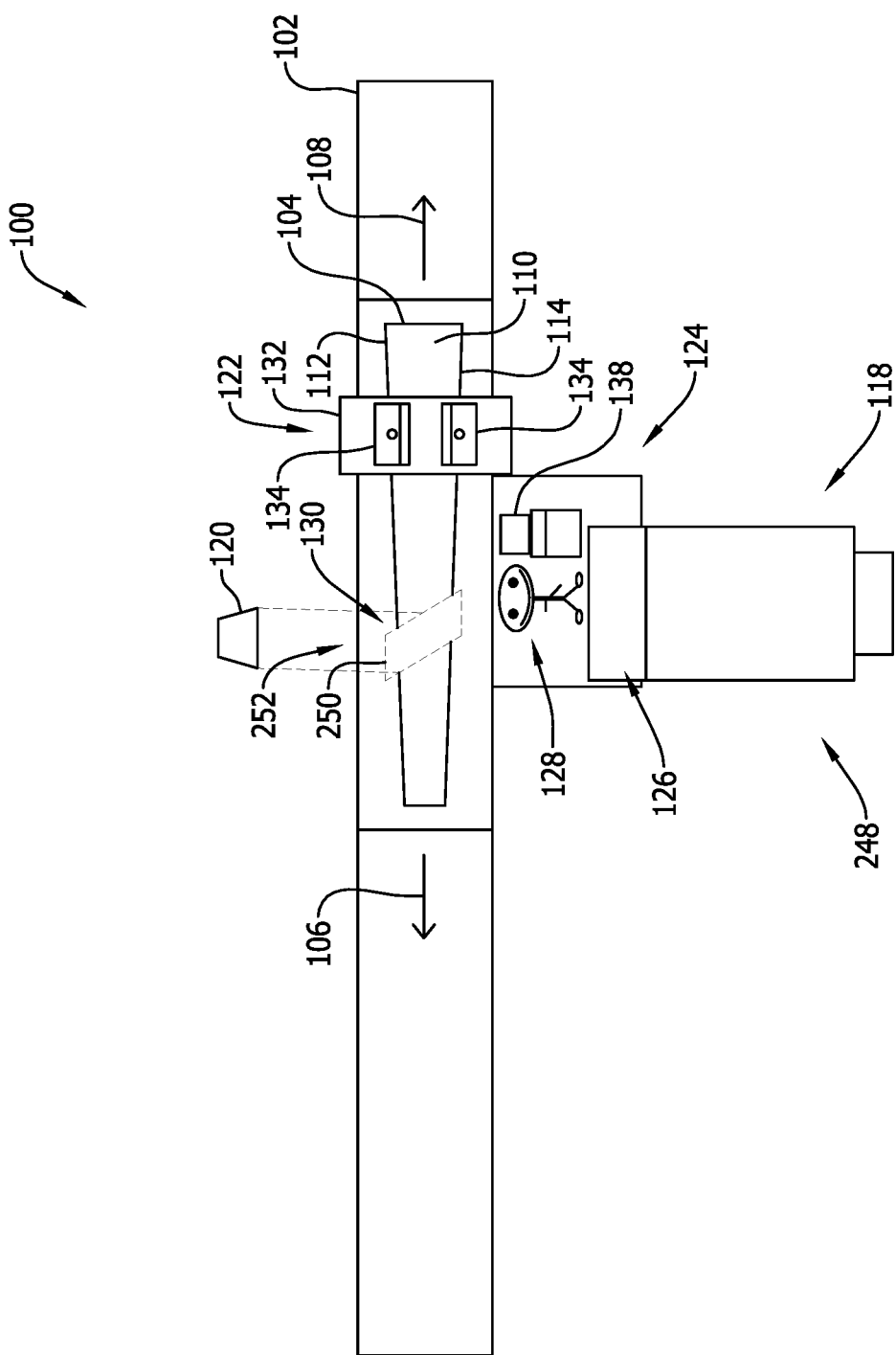
FIG. 2 is a schematic illustration of the ply laydown system shown in FIG. 1 shown performing a second step of the laydown process.
Figure 3:
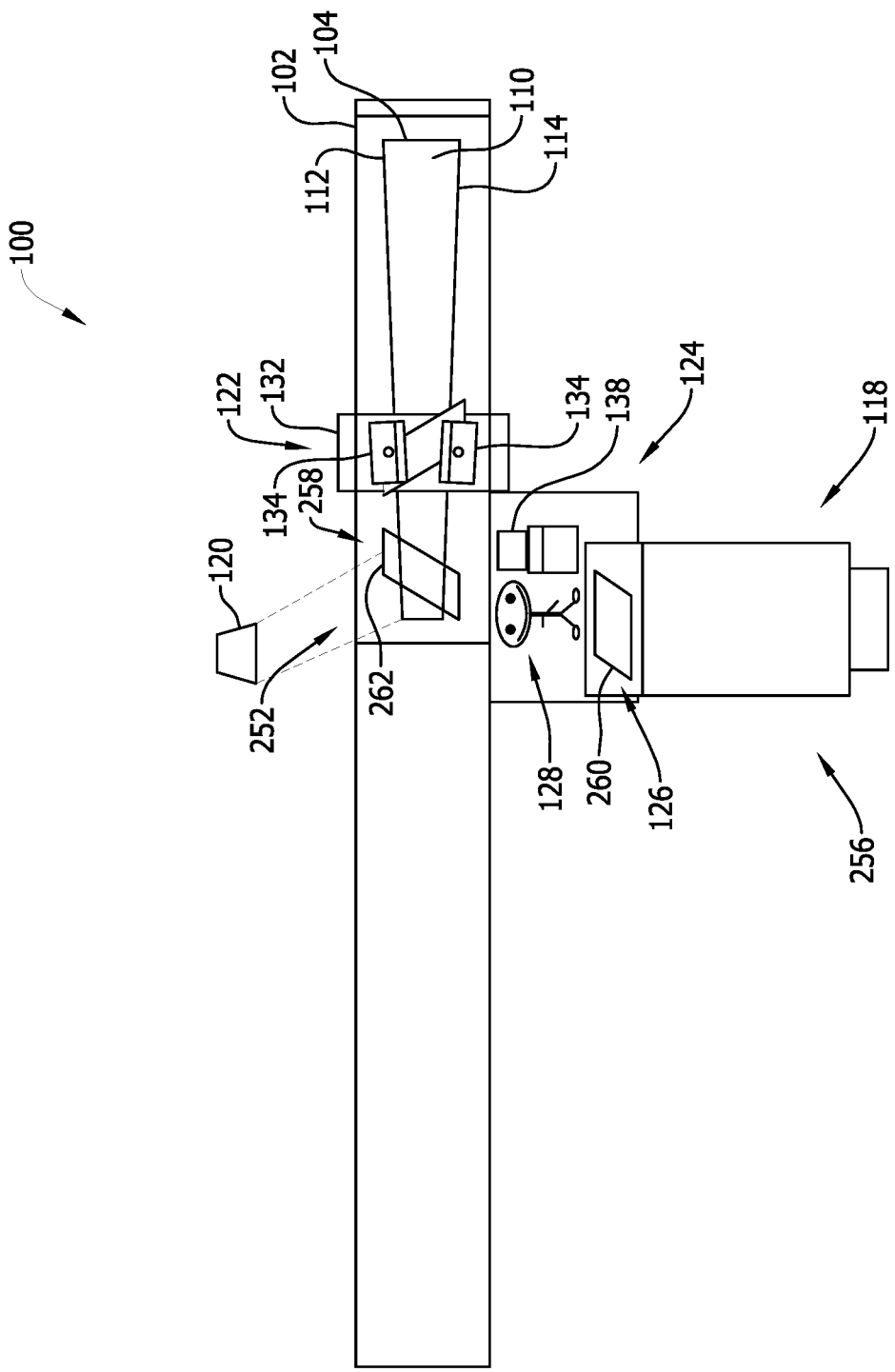
FIG. 3 is a schematic illustration of the ply laydown system shown in FIG. 1 shown performing a third step of the laydown process.

FIGS. 1-3 are schematic illustrations of an example system 100 shown performing a series of steps of a laydown process. In the example implementation, system 100 includes a tool platform 102 and a forming tool 104 that is movable on tool platform 102 in a first direction 106 and an opposite second direction 108. As will be described in more detail below, forming tool 104 receives plies of composite material thereon, and the plies conform to the contours of forming tool 104 such that a resulting composite structure formed from the plies has a shape that corresponds to the shape of forming tool 104. In some implementations, forming tool 104 is shaped to fabricate elongated spars, empennages, stringers, and the like. Thus, in the example implementation, forming tool 104 includes a web surface 110, and a first flange surface 112 and a second flange surface 114 both extending perpendicularly from web surface 110. Forming tool 104 also includes a length dimension 116. Some known elongated composite structures, such as those listed above, are defined by a constant or variable radius of curvature extending in their lengthwise dimension. Thus, web surface 110, first flange surface 112, and/or second flange surface 114 likewise may be defined with a radius of curvature along length dimension 116 to facilitate forming the composite structures.

System 100 also includes a ply distribution apparatus 118, a ply positioner 120, a ply compaction apparatus 122, and an operator station 124. Ply distribution apparatus 118 provides a plurality of plies 126 of composite material to forming tool 104 one at a time in a ply laydown sequence. Ply distribution apparatus 118 is positionable at different locations along length dimension 116 of forming tool 104. For example, in the example implementation, forming tool 104 is movable relative to ply distribution apparatus 118 when translated in first direction 106 or second direction 108 along tool platform 102. Alternatively, ply distribution apparatus 118 is movable, in first direction 106 and second direction 108, relative to forming tool 104 that is stationarily affixed on tool platform 102. In either implementation, ply distribution apparatus 118 is positionable at the different locations along forming tool 104 to facilitate streamlining the ply laydown workflow process, as will be described in more detail below.

Each ply 126 of composite material is provided to an operator 128, who may then manually remove ply 126 from ply distribution apparatus 118 for positioning on forming tool 104. Each ply 126 is provided by ply distribution apparatus 118 in accordance with a ply laydown sequence. Each ply 126 in the ply laydown sequence may be different from each other by at least one parameter such as, but not limited to, fiber orientation, weave pattern, ply laydown orientation based on the fiber orientation and/or weave pattern, ply laydown location, and overall ply shape. Thus, ply positioner 120 facilitates providing operator 128 with visual positioning guidance on forming tool 104 to facilitate the ply laydown operation. Ply positioner 120 may be any device that enables system 100 to function as described herein. An example ply positioner 120 includes, but is not limited to, an overhead laser template that projects a plurality of ply templates 130 onto forming tool 104, one at a time, in accordance with the ply laydown sequence.

Ply compaction apparatus 122 includes a chassis 132 and a pair of flange forming devices 134 coupled to chassis 132. Chassis 132 is movable relative to forming tool 104 along length dimension 116. For example, in the example implementation, forming tool 104 is movable relative to chassis 132 when translated in first direction 106 or second direction 108 along tool platform 102. Alternatively, chassis 132 is movable, in first direction 106 and second direction 108, relative forming tool 104 that is stationarily affixed on tool platform 102. In either implementation, ply compaction apparatus 122 is positionable at different locations along forming tool 104 to enable plies 126 to be compacted onto forming tool 104 after each iterative step in the ply laydown process, for example.

Operator station 124 includes a user interface 138 that may be used to control operation of system 100. User interface 138 may be any device capable of facilitating communication between itself and the various apparatuses of system 100. For example, user interface 138 may be a computer work station, a mobile device, and the like. As will be described in more detail below, user interface 138 may be used by operator 128 to facilitate semi-autonomous operation of system 100, such as by triggering the various apparatuses of system 100 to perform the next step in the ply laydown process.

Figure 4:
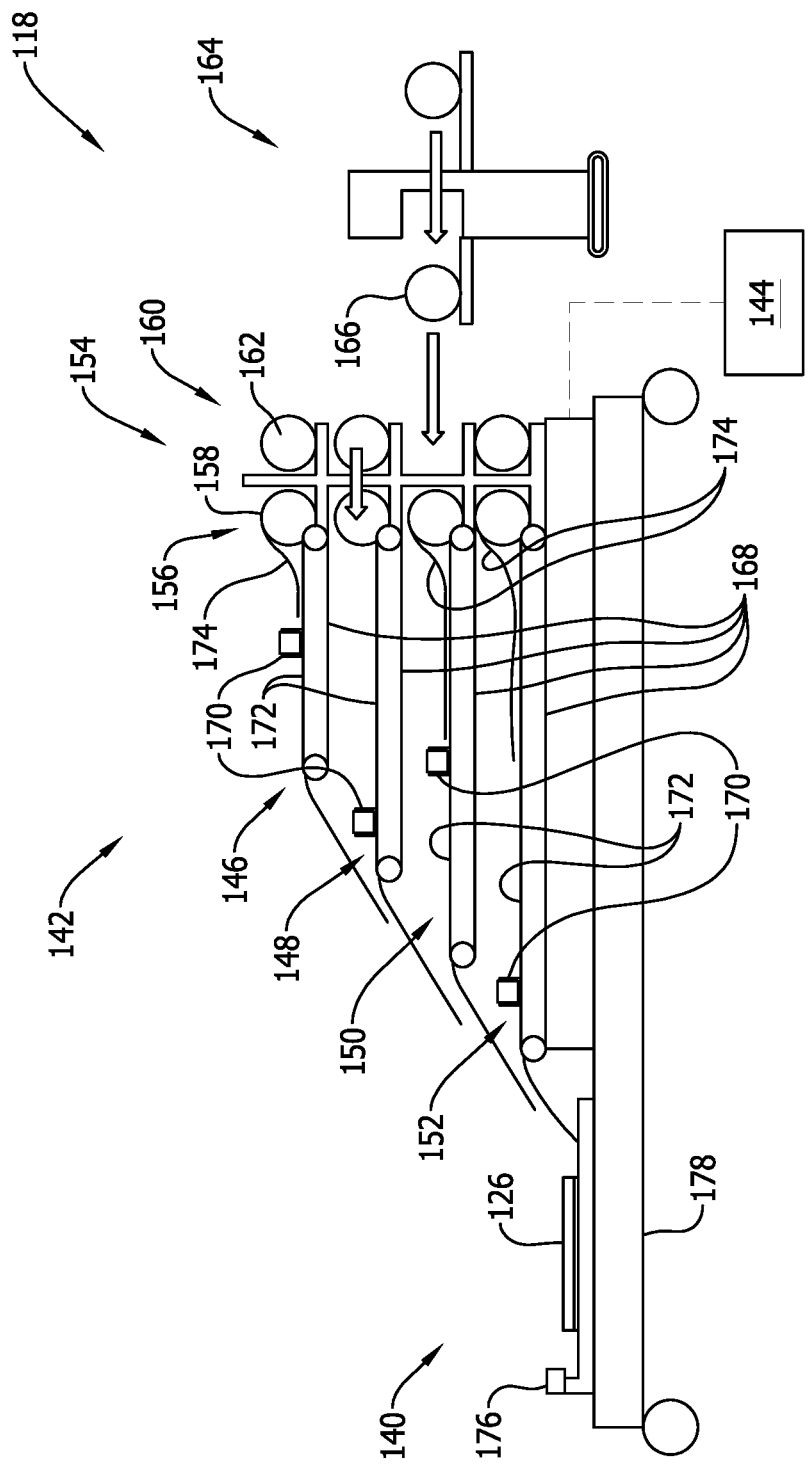
FIG. 4 is a schematic illustration of an example ply distribution apparatus that may be used in the system shown in FIG. 1.

FIG. 4 is a schematic illustration of ply distribution apparatus 118. In the example implementation, ply distribution apparatus 118 includes a work station 140, a feed system 142, and a controller 144 in communication with feed system 142. Feed system 142 includes a plurality of dispensers, such as a first dispenser 146, a second dispenser 148, a third dispenser 150, and a fourth dispenser 152. Each dispenser 146, 148, 150, and 152 includes a mounting device 154 configured to hold rolls of sheet material thereon. For example, mounting device 154 includes a dispensing position 156 that contains a first roll 158 of sheet material, and a backup position 160 that contains a second roll 162 of sheet material. When first roll 158 is depleted, mounting device 154 may move second roll 162 from backup position 160 to dispensing position 156 to enable operation of ply distribution apparatus 118 to be continued without interruption. Moving second roll 162 into dispensing position 156 facilitates creating open capacity within mounting device 154 at backup position 160. Thus, in one implementation, ply distribution apparatus 118 also includes a loading system 164 for replacing rolls 166 of sheet material within feed system 142 when depleted. For example, loading system 164 loads additional rolls 166 into backup positions 160 when empty.

Feed system 142 also includes a transport mechanism 168 associated with each dispenser 146, 148, 150, and 152, and a cutter 170 associated with each transport mechanism 168. Each transport mechanism 168 has a work surface 172 for receiving a sheet 174 of composite material thereon. In operation, sheet 174 of composite material is provided on work surface 172, and cutter 170 cuts sheet 174 to form ply 126 of composite material. Transport mechanism 168 then provides ply 126 to work station 140 for retrieval by operator 128 (shown in FIG. 1). In an alternative implementation, dispensers 146, 148, 150, and 152 provide respective sheets 174 of composite material to the same transport mechanism 168 and cutter 170.

The number of dispensers 146, 148, 150, and 152 to be included in feed system 142 is based on the number of different types of composite material to be used in fabricating the composite structure on forming tool 104 (shown in FIG. 1). The plurality of plies 126 of composite material used to fabricate the composite structure may be derived from sheet material that is different from each other in at least one physical characteristic such as, but not limited to, fiber orientation and/or weave pattern. For example, in the example implementation, sheet material dispensed from first dispenser 146 has a 90 degree fiber orientation, sheet material dispensed from second dispenser 148 has a 0 degree fiber orientation, sheet material dispensed from third dispenser 150 has a +45 degree fiber orientation, and the sheet material dispensed from fourth dispenser 152 has a −45 degree fiber orientation. Loading the different sheet materials on independent and dedicated dispensers 146, 148, 150, and 152 enables each ply 126 in the predetermined laydown sequence to be delivered sequentially, on-demand.

In one implementation, the on-demand delivery is facilitated by controller 144. For example, controller 144 facilitates selectively dispensing sheet 174 of composite material from one of dispensers 146, 148, 150, and 152 at a time based on the next ply 126 needed in the predetermined laydown sequence. Sheet 174 is then cut by cutter 170 to form ply 126, which is then provided to work station 140. Alternatively, sheets 174 of composite material are provided from each dispenser 146, 148, 150, and 152 on respective work surfaces 172 simultaneously, and one sheet 174 is cut at a time based on the predetermined laydown sequence. More specifically, controller 144 controls operation of cutters 170 to cut the one sheet 174 based on the predetermined laydown sequence. The uncut sheets 174 are held in a queue on the respective work surfaces 172 to facilitate improving production speed in an efficient manner.

As described above, operation of system 100 may be controlled semi-autonomously based on a triggering event, such as a command received from operator 128, at various stages in the manufacturing process. Alternatively, one or more triggering events may be provided automatically to facilitate reducing the workload of operator 128. For example, in the example implementation, ply distribution apparatus 118 also includes a sensor 176 in communication with controller 144. Sensor 176 monitors the presence of ply 126 of composite material at work station 140, and transmits a signal to controller 144 when ply 126 has been removed from work station 140, such as by operator 128. The signal provides an indication that the next step in the manufacturing process may be performed by ply distribution apparatus 118, and that work station 140 is ready to receive the next ply in the laydown sequence. Thus, upon receiving the signal, controller 144 directs feed system 142 deliver another ply 126 of composite material to work station 140.

As described above, ply distribution apparatus 118 is movable relative to forming tool 104 to reduce the workload of operator 128 and improve the efficiency of the ply laydown process. As shown in FIG. 4, ply distribution apparatus 118 includes a mobile platform 178 coupled to feed system 142. Mobile platform 178 transports feed system 142 to one or more locations along length dimension 116 of forming tool 104. Movement of mobile platform 178 may be facilitated by the use of wheels, tracks, and the like.

Figure 5:
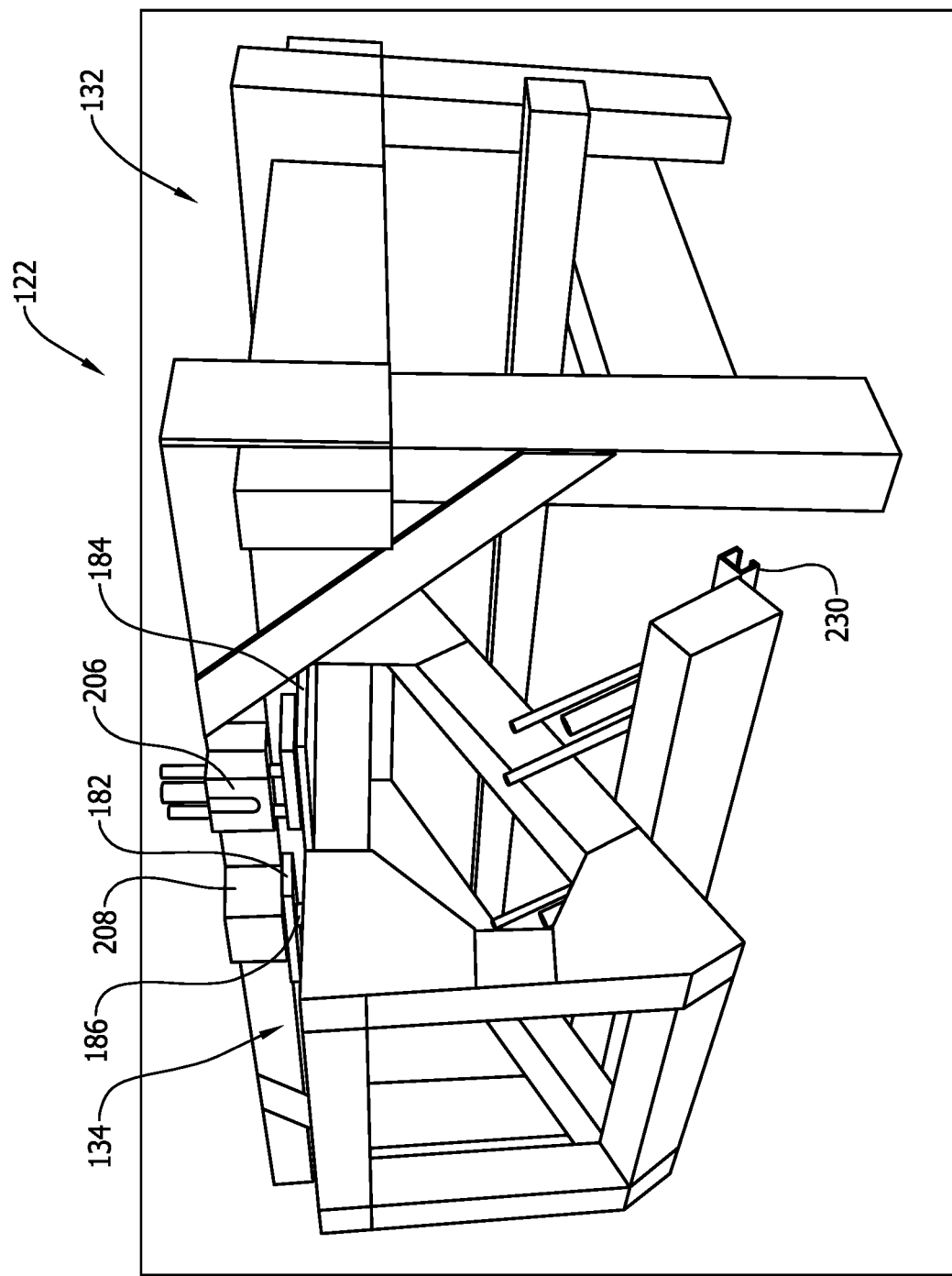
FIG. 5 is a perspective view of an example ply compaction apparatus that may be used in the system shown in FIG. 1.
Figure 6:
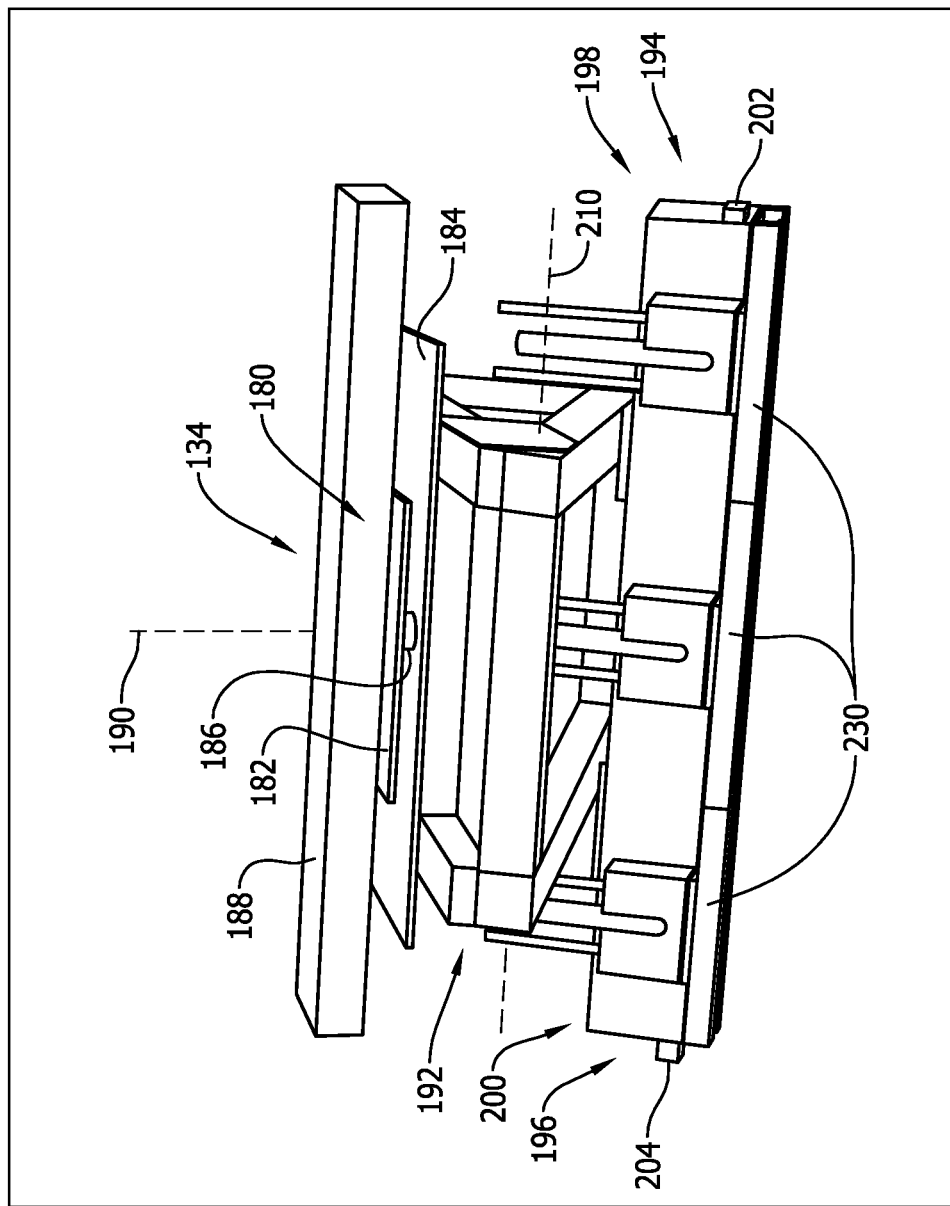
FIG. 6 is a perspective view of an example flange forming device detached from the apparatus shown in FIG. 5.

FIG. 5 is a perspective view of ply compaction apparatus 122, and FIG. 6 is a perspective view of flange forming device 134 detached from chassis 132. In the example implementation, ply compaction apparatus 122 includes chassis 132 a pair of flange forming devices 134 coupled to chassis 132. Ply compaction apparatus 122 also includes a bearing plate 180 coupled between chassis 132 and each flange forming device 134. Bearing plate 180 includes a first mounting surface 182, a second mounting surface 184, and an actuator 186 coupled therebetween. First mounting surface 182 is coupled to chassis 132, such as to a frame member 188 of chassis 132, and second mounting surface 184 is coupled to flange forming device 134. In operation, actuator 186 rotates first mounting surface 182 and second mounting surface 184 relative to each other, and flange forming device 134 is rotatable with second mounting surface 184 about a yaw axis 190. When chassis 132 is positioned over forming tool 104 (shown in FIG. 1), yaw axis 190 is oriented substantially perpendicularly to length dimension 116 (shown in FIG. 1).

In the example implementation, flange forming device 134 includes a base 192 and a forming head 194 coupled to base 192. As will be described in more detail below, forming head 194 is movable in a predefined range of motion when performing a ply application and compaction operation for applying pressure to a work surface (e.g., web surface 110, first flange surface 112, and second flange surface 114 (shown in FIG. 1)) and compacting plies 126 (shown in FIG. 1) of composite material on forming tool 104. As described above, at least one surface of forming tool 104 may be defined with a radius of curvature along length dimension 116. As such, the rotational orientation of each flange forming device 134 relative to forming tool 104 is dynamically adjustable with bearing plate 180 to facilitate maintaining parallelism with contoured surfaces of forming tool 104. For example, in the example implementation, flange forming device 134 also includes a orientation sensor 196 for determining a relative rotational orientation of forming head 194 to the work surface. Actuator 186 rotates flange forming device 134 based on the determined relative rotational orientation.

Orientation sensor 196 may be any mechanical, electrical, or electromechanical device that enables ply compaction apparatus 122 to function as described herein. In one implementation, forming head 194 includes a first end 198 and a second end 200, and orientation sensor 196 includes a first sensor 202 at first end 198 and a second sensor 204 at second end 200. First sensor 202 and second sensor 204 facilitate determining a relative distance of first end 198 and second end 200 to the work surface. In response to feedback received from orientation sensor 196, actuator 186 rotates flange forming device 134 about yaw axis 190 until the relative distance of first end 198 and second end 200 to the work surface is substantially equal. Flange forming device 134 is then held in the selected rotational orientation, wherein forming head 194 oriented to contact forming tool 104 with minimal variations in contact pressure across the work surface.

Flange forming device 134 includes a friction brake 206 for holding itself in the selected rotational orientation. For example, friction brake 206 engages first mounting surface 182 and/or second mounting surface 184 when in operation. As such, flange forming device 134 is orientable in any desirable rotational orientation about yaw axis 190 without being mechanically rotationally limited by its own braking system.

Flange forming device 134 also includes a pitch actuator 208 that rotates flange forming device 134 about a pitch axis 210 that is perpendicular to yaw axis 190. In one implementation, web surface 110 of forming tool 104 extends in a non-horizontal plane along length dimension 116. Thus, pitch actuator 208 is operable to selectively orient forming head 194 to be substantially parallel with web surface 110 to contact forming tool 104 with minimal variations in contact pressure across the work surface.

Figure 7:
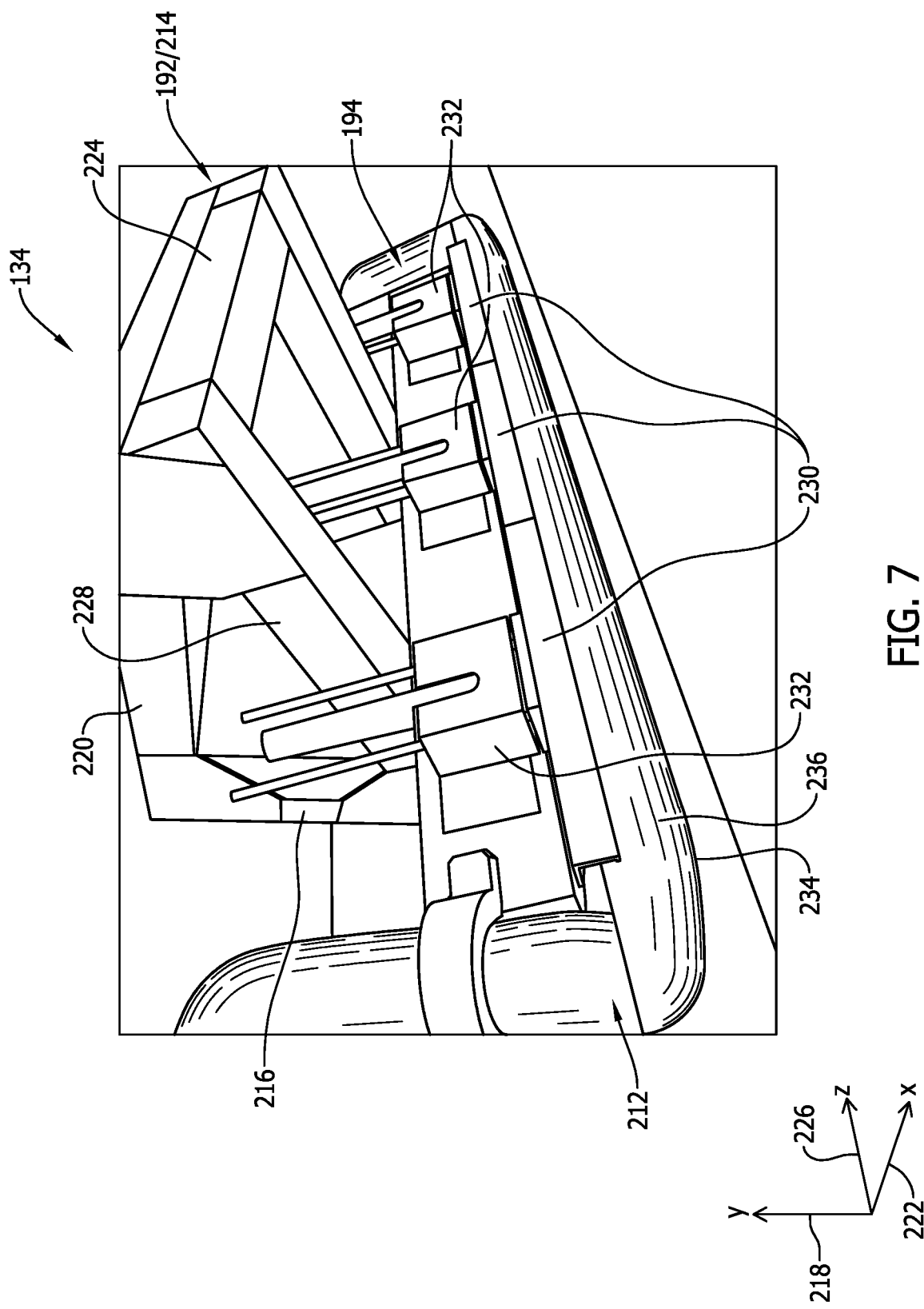
FIG. 7 is a perspective view of the flange forming device shown in FIG. 6 including an example contact element coupled thereto.

FIG. 7 is a perspective view of flange forming device 134 including an example contact element 212 coupled thereto. In the example implementation, base 192 includes a plurality of frame members 214 coupled to each other in an arrangement that enables forming head 194 to be movable in at least two dimensions. For example, frame members 214 include at least one vertical member 216 extending with a y-axis 218, at least one horizontal member 220 extending with an x-axis 222, a cross member 224 extending with a z-axis 226, and a track member 228 oriented obliquely relative to y-axis 218 and x-axis 222. Forming head 194 is coupled to, and translatable along, track member 228 to facilitate moving forming head 194 relative to y-axis 218 and x-axis 222.

In addition, forming head 194 includes a plurality of holding members 230, and a deployment actuator 232 coupled to each holding member 230. Deployment actuators 232 are linear actuators that are operable to move each holding member 230 relative to base 192, and relative to y-axis 218 and x-axis 222, independently of each other. However, in the example implementation, deployment actuators 232 are operable to coordinate movement of the plurality of holding members 230 with each other. As such, the movement of forming head 194 relative to track member 228, and of holding members 230 relative to base 192, facilitates defining a predefined range of motion that may be executed by forming head 194 when performing the ply application and compaction operation.

As shown in FIG. 7, contact element 212 extends across the plurality of holding members 230. As noted above, movement of the plurality of holding members 230 is coordinated to define the predefined range of motion. To this end, contact element 212 is a continuous physical member coupled to each holding member 230 such that holding members 230 are dependently movable with each other when a force is induced on contact element 212. However, forming head 194 is segmented such that holding members 230 are also each independently deflectable relative to each other. As such, holding members 230 are deflectable to be adaptable to the contours of forming tool 104 (shown in FIG. 1).

In the example implementation, contact element 212 is an inflatable hollow member that is pressurized with fluid, such as liquid or air, to define a deformable contact surface 234. For example, contact element 212 is selectively pressurized to a degree that enables deformable contact surface 234 to be adaptable to the contours of forming tool 104. When pressurized, contact element 212 has a diameter of at least about 1 inch, at least about 1.5 inches, at least about 2 inches, or defined within a range between about 1 inch and about 2 inches. In general, local compliance of contact element 212 when applying pressure to forming tool 104 is enhanced as the size of contact element 212 is increased. The enhanced local compliance facilitates maintaining a substantially uniform pressure across forming tool 104, as applied by deformable contact surface 234, especially as contact element 212 transitions from web surface 110 to one of first flange surface 112 or second flange surface 114 (all shown in FIG. 1) when performing the ply application and compaction operation.

Contact element 212 may be pressurized to any degree that enables ply compaction apparatus 122 to function as described herein. For example, the pressurization is selected to mitigate increases in friction during compaction caused by deflation of contact element 212, and to ensure contact element 212 is conformable to the surface geometries of forming tool 104. In the example implementation, contact element 212 is pressurized within a range between about 10 pounds per square inch (psi) and about 50 psi, between about 10 psi and about 40 psi, between about 10 psi and about 30 psi, and between about 15 psi and about 25 psi.

Contact element 212 may be fabricated from any material that enables ply compaction apparatus 122 to function as described herein. Example materials include, but are not limited to, synthetic fibers such as polyester or nylon. In addition, forming head 194 may also include a sleeve 236 extending over contact element 212. Sleeve 236 is fabricated of material having a lower coefficient of friction that that of contact element 212. Sleeve 236 is also fabricated of material that is stretchable, such as when contact element 212 transitions from an unpressurized to a pressurized state, without losing structural integrity. An example material that may be used to fabricate sleeve 236 includes, but is not limited to, a spandex material.

Figure 8:
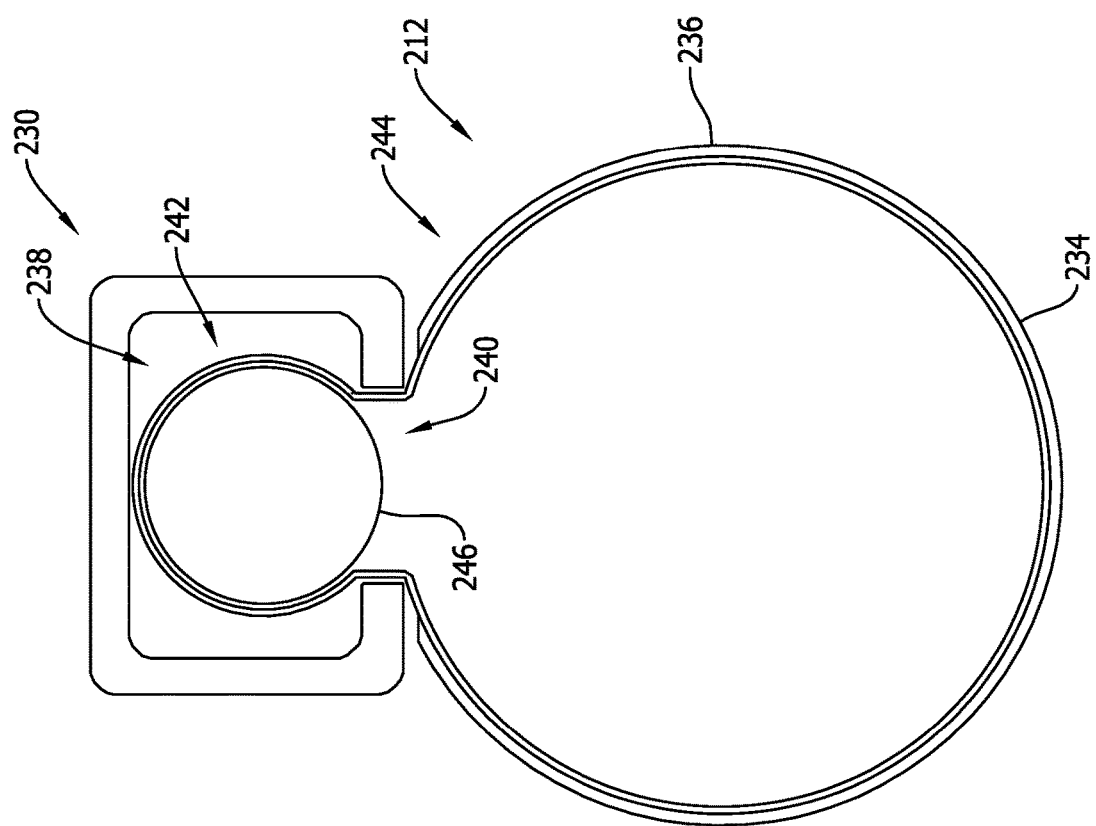
FIG. 8 is a cross-sectional view of a portion of the flange forming device shown in FIG. 7, taken along line 8-8.

FIG. 8 is a cross-sectional view of a portion of flange forming device 134. As noted above, contact element 212 extends across the plurality of holding members 230. As shown in FIG. 8, contact element 212 is coupled within holding members 230. For example, holding members 230 each include a longitudinal channel 238, and a longitudinal slot 240 defined therein that provides access to longitudinal channel 238. A first portion 242 of contact element 212 is insertable through longitudinal slot 240 for retention within longitudinal channel 238, and a second portion 244 of contact element 212 extends from holding members 230 for defining deformable contact surface 234. First portion 242 is retained within longitudinal channel 238 with an elongated rod 246 coupled within longitudinal channel 238. Longitudinal slot 240 is sized to restrict movement of elongated rod 246 therethrough to facilitate retaining first portion 242 within longitudinal channel 238.

Referring to FIGS. 1-3, the drawings illustrate a series of process steps of the ply laydown process. As shown in FIG. 1, the ply laydown process includes positioning ply distribution apparatus 118 at a first location 248 relative to forming tool 104, and providing a first ply 250 in the ply laydown sequence from ply distribution apparatus 118. First ply 250 is provided by dispensing a first sheet of composite material, and then cutting the first sheet, as shown in FIG. 4. First location 248 is selected to reduce a relative distance between ply distribution apparatus 118 and a first ply laydown location 252 on forming tool 104. As such, the workload of operator 128, who is also at first location 248, is reduced by eliminating the need for operator 128 to manually walk individual plies from a home location to each ply laydown location.

First ply laydown location 252 may be defined by a first ply template 254 projected onto forming tool 104 by ply positioner 120. As noted above, ply positioner 120 projects a plurality of ply templates onto forming tool 104, one at a time, in accordance with the ply laydown sequence. As shown in FIG. 2, operator 128 retrieves first ply 250 from ply distribution apparatus 118, and positions first ply 250 on forming tool 104 in an orientation that corresponds with first ply template 254. Operator 128 retrieving first ply 250 from ply distribution apparatus 118 is a triggering event that initiates the next step(s) in the ply laydown process. The next step(s) may be initiated manually by a command received from operator 128 using user interface 138, or by a signal received from sensor 176 that monitors the presence of first ply 250 within ply distribution apparatus 118.

Referring to FIG. 3, ply distribution apparatus 118 is moved from first location 248 to a second location 256 along length dimension 116 in response to the triggering event. In one implementation, movement of ply distribution apparatus 118 is performed automatically in response to the triggering event to enhance the speed and efficiency of the ply laydown process. For example, positioning ply distribution apparatus 118 at second location 256 facilitates reducing a relative distance between ply distribution apparatus 118 and a second ply laydown location 258 on forming tool 104, wherein second ply laydown location 258 is offset a distance from first ply laydown location 252. After operator 128 has positioned first ply 250 on forming tool 104, he can then move to second location 256 to retrieve second ply 260 from ply distribution apparatus 118. Ply positioner 120 projects a second ply template 262 onto forming tool 104. Operator 128 can then retrieve second ply 260 from ply distribution apparatus 118, and position second ply 260 on forming tool 104 in an orientation that corresponds with second ply template 262. This movement and ply retrieval operation may be repeated for each ply in the ply laydown process.

In addition, after operator 128 has positioned first ply 250 on forming tool 104, chassis 132 is positioned at first location 248 to facilitate applying first ply 250 onto forming tool 104. As described above, the ply application and compaction operation includes selectively orienting flange forming devices 134 relative to forming tool 104 to account for the complex geometry of web surface 110, first flange surface 112, and/or second flange surface 114. Accordingly, each flange forming device 134 of ply compaction apparatus 122 may be selectively rotated about yaw axis 190, or pitch axis 210, based on a relative orientation of flange forming devices 134 to surfaces 110, 112, and/or 114. As such, as shown in FIG. 3, flange forming devices 134 may be oriented obliquely relative to length dimension 116.

Figure 9:
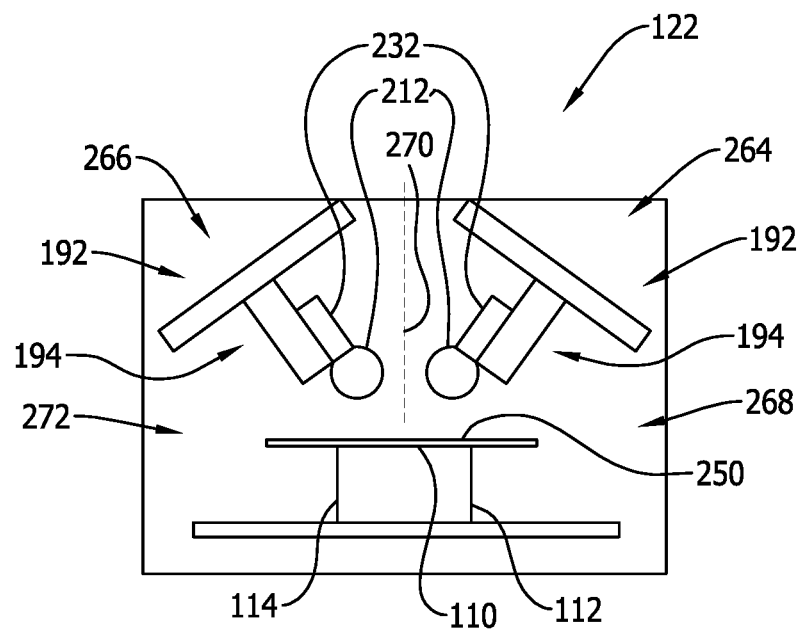
FIGS. 9-13 illustrate a sequence of motions that may be performed by the ply compaction apparatus shown in FIG. 1 in forming a composite structure.

FIGS. 9-13 illustrate a sequence of motions that may be performed by the ply compaction apparatus 122 in forming a composite structure, such as when positioned at first location 248 (shown in FIG. 3). In the example implementation, ply compaction apparatus 122 includes a first flange forming device 264 and a second flange forming device 266. First flange forming device 264 is positioned on a first side 268 of forming tool 104 relative to a centerline 270 of compaction apparatus 122, and second flange forming device 266 is positioned on a second side 272 of forming tool 104 relative to centerline 270. As shown in FIG. 9, first flange forming device 264 and second flange forming device 266 have been selectively rotated relative to forming tool 104, as shown in FIG. 3, and are ready to initiate the ply application and compaction operation.

Figure 10:
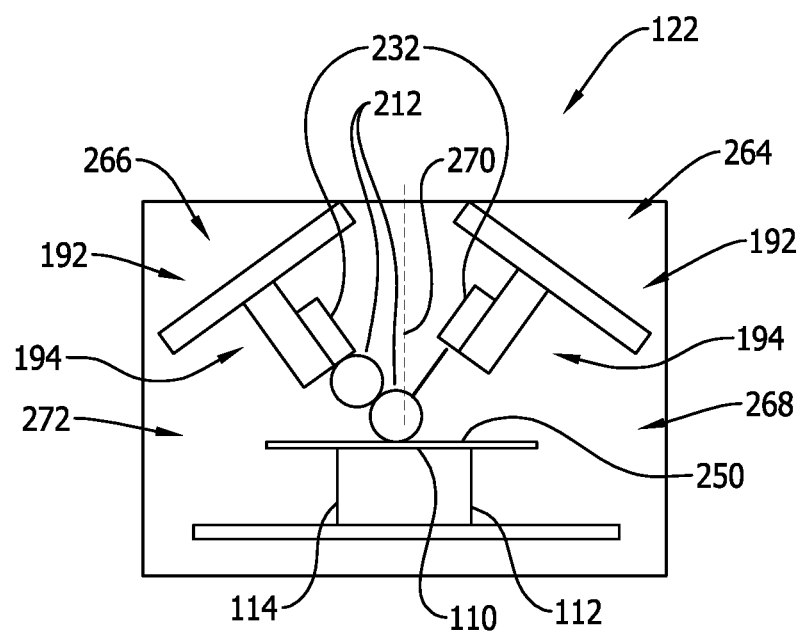
Figure 11:
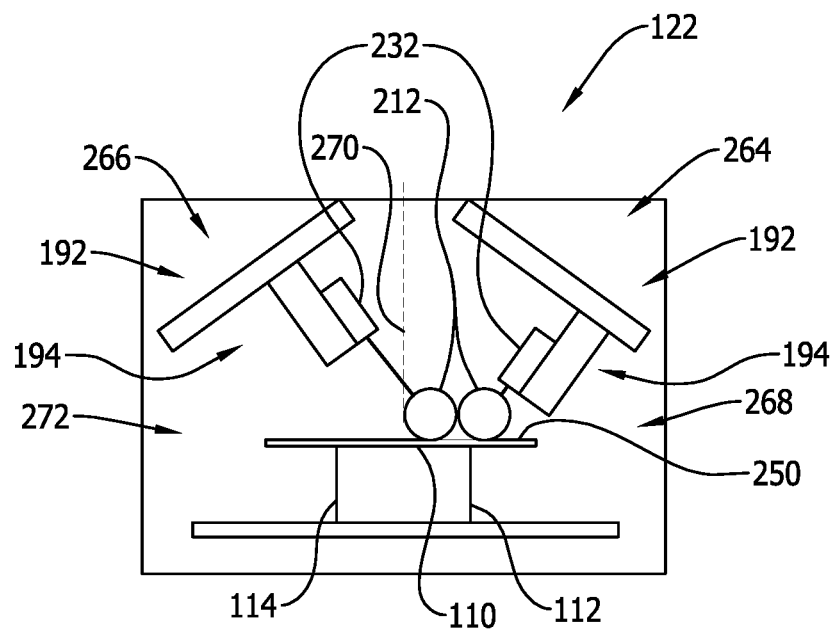
Figure 12:
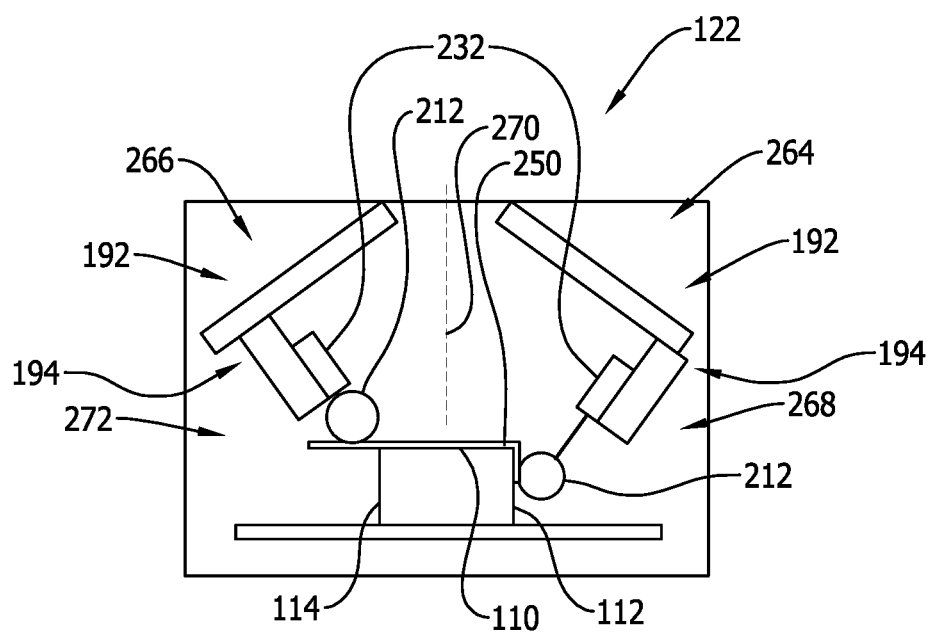
Figure 13:
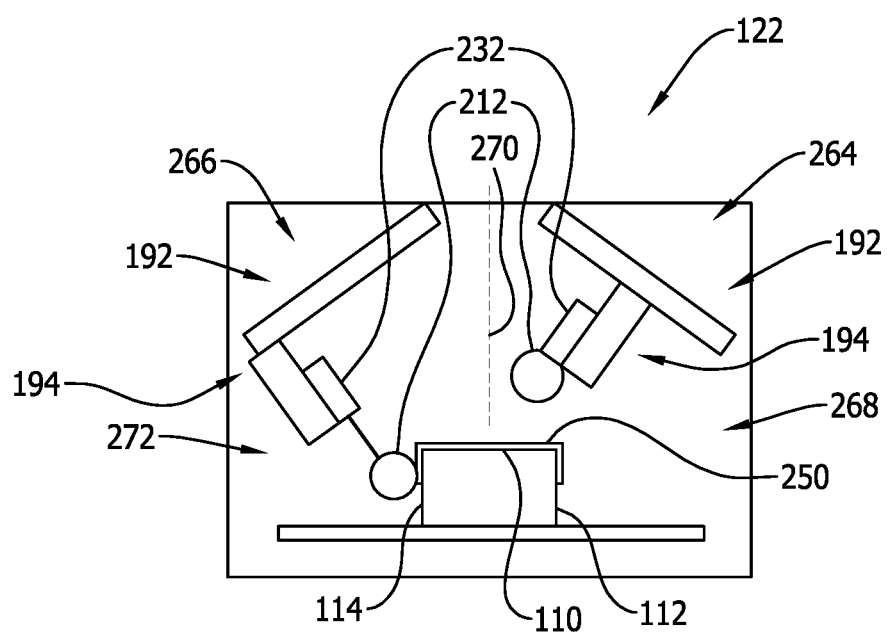

Referring to FIG. 10, forming head 194 of first flange forming device 264 is positioned relative to base 192 such that, when extended from base 192, forming head 194 extends across centerline 270 when contact is initiated with first ply 250. Referring to FIGS. 11 and 12, forming head 194 is then swept across web surface 110 and first flange surface 112 by selective movement of forming head 194 relative to base 192. Contact between forming head 194 and first ply 250 is maintained as forming head 194 moves along its predefined range of motion, and the range of motion is selected to apply pressure continuously across web surface 110 and first flange surface 112. For example, contact element 212 is inflated to a degree, and the range of motion is selected, such that a change in pressure applied to first ply 250 from forming head 194 is less than a predetermined threshold (e.g., less than about 20 percent change in pressure). After forming head 194 is swept across first flange surface 112, forming head 194 is returned to a home position, as shown in FIG. 13.

Forming head 194 of second flange forming device 266 performs a similar motion to ensure the entire surface of first ply 250 is compacted by either first flange forming device 264 or second flange forming device 266. Motion of second flange forming device 266 is initiated after forming head 194 of first flange forming device 264 has moved across centerline 270 for positioning on first side 268 of forming tool 104. Forming head 194 is then swept across web surface 110 and second flange surface 114 by selective movement of forming head 194 relative to base 192. Forming head 194 is returned to a home position after being swept across second flange surface 114. Chassis 132 may then be moved to second location 256, to perform the ply application and compaction operation on second ply 260, as shown in FIG. 3.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use in ply compaction in forming a composite structure, the apparatus comprising:
   a forming tool comprising a web surface and at least one flange surface extending from the web surface, wherein the forming tool comprises a length dimension;
   a chassis extending over the forming tool, wherein at least one of the forming tool or the chassis are movable relative to the other to enable the chassis to traverse the forming tool in the length dimension; and
   first and second flange forming devices coupled to the chassis, wherein each of the first and second flange forming devices comprises a respective first or second inflatable contact element pressurized to define a respective first or second deformable contact surface, the first and second contact surfaces being independently actuatable relative to both an x-axis and a y-axis and configured to simultaneously engage with both the web surface and the at least one flange surface, and wherein the first and second flange forming devices are movable with the chassis to be positioned at different locations along the length dimension of the forming tool, the first and second flange forming devices configured to perform a ply compaction operation when positioned at each respective location.

2. The apparatus in accordance with claim 1, wherein each of the first and second flange forming devices comprises a base and a forming head coupled to the base, wherein each forming head comprises a plurality of holding members, the first or second inflatable contact element extending across the respective plurality of holding members.

3. The apparatus in accordance with claim 2, wherein each forming head is movable relative to the respective base to apply pressure continuously across the web surface and then across the at least one flange surface with the respective first or second deformable contact surface.

4. The apparatus in accordance with claim 1, wherein the forming tool is contoured to define a variable radius of curvature in the at least one flange surface along the length dimension.

5. The apparatus in accordance with claim 1 further comprising first and second sleeves respectively extending over the first and second inflatable contact elements, wherein each sleeve has a lower coefficient of friction than the respective inflatable contact element.

6. The apparatus in accordance with claim 2, wherein each of the plurality of holding members comprises a longitudinal channel and a longitudinal slot that provides access to the longitudinal channel, wherein a portion of each of the first and second inflatable contact elements is insertable through the longitudinal slot for retention within the longitudinal channel.

7. The apparatus in accordance with claim 2 further comprising a deployment actuator coupled to each holding member, wherein the deployment actuator is configured to move each holding member independently of each other.

8. The apparatus in accordance with claim 1 further comprising:
   a base; and
   first and second forming heads coupled to the base, wherein each forming head comprises a respective first or second plurality of holding members, and wherein each of the first and second inflatable contact elements extends across the respective first or second plurality of holding members.

9. The apparatus in accordance with claim 8, wherein each forming head further comprises a sleeve extending over the inflatable contact element, wherein each sleeve has a lower coefficient of friction than the respective inflatable contact element.

10. The apparatus in accordance with claim 8, wherein each holding member of both pluralities of holding members comprises a longitudinal channel and a longitudinal slot that provides access to the longitudinal channel, wherein a portion of the first or second inflatable contact element is insertable through the respective longitudinal slot for retention within the respective longitudinal channel.

11. The apparatus in accordance with claim 10, further comprising an elongated rod coupled within the longitudinal channel for retaining the insertable portion of the inflatable contact element therein, wherein the longitudinal slot is sized to restrict movement of the elongated rod therethrough.

12. The apparatus in accordance with claim 8, wherein each of the first and second inflatable contact elements has, when pressurized, a diameter of at least about 1 inch.

13. The apparatus in accordance with claim 8 further comprising a deployment actuator coupled to each holding member, wherein the deployment actuator is configured to move each holding member relative to the base independently of each other.

14. The apparatus in accordance with claim 8, wherein each holding member of both pluralities of holding members are each independently deflectable relative to each other.

15. The apparatus in accordance with claim 1, wherein the apparatus is adapted to:
   position a ply of material on the web surface of the forming tool and the at least one flange surface extending from the web surface;
   position the first and second flange forming devices at the ply of material on the forming tool;
   apply, by the first and second deformable contact surfaces, the ply of material onto the forming tool with a predetermined pressure, wherein the deformable contact surfaces are moved across the forming tool, and wherein the first and second inflatable contact elements are configured to maintain the predetermined pressure as each deformable contact surface transitions from the web surface to the at least one flange surface.

16. The apparatus in accordance with claim 15, wherein the apparatus is further adapted to selectively pressurize the first and second inflatable contact elements to a degree that enables the respective first and second deformable contact surfaces to be adaptable to contours of the forming tool while maintaining the predetermined pressure.

17. The apparatus in accordance with claim 15, wherein each of the first and second flange forming devices includes a respective first or second forming head that is movable in a predefined range of motion, wherein applying the ply of material comprises moving each forming head along the predefined range of motion to apply pressure continuously across the web surface and the at least one flange surface.

18. The apparatus in accordance with claim 17, wherein the first and second forming heads each include a plurality of holding members, each inflatable contact element extending across the respective plurality of holding members, wherein moving each deformable contact surface comprises moving each holding member independently of other holding members.

19. The apparatus in accordance with claim 17, wherein the first and second forming heads each include a plurality of holding members, each inflatable contact element extending across the respective plurality of holding members, wherein moving each deformable contact surface comprises coordinating movement of the each of the plurality of holding members with other holding members of the plurality of holding members.

20. The apparatus in accordance with claim 15, wherein a first location and a second location are defined along a length dimension of the forming tool, and wherein positioning the first and second flange forming devices comprises:
  positioning the chassis at the first location;
  performing the applying and moving steps at the first location; and
  moving the chassis relative to the forming tool to position the chassis at the second location.

* * * * *